June 10, 1941.  E. S. MINARD  2,245,287
LIQUID METERING MACHINE
Filed March 9, 1940  4 Sheets-Sheet 1

INVENTOR.
EVERETT S. MINARD
BY
*A. Schapps*
ATTORNEY

June 10, 1941.   E. S. MINARD   2,245,287
LIQUID METERING MACHINE
Filed March 9, 1940   4 Sheets-Sheet 2
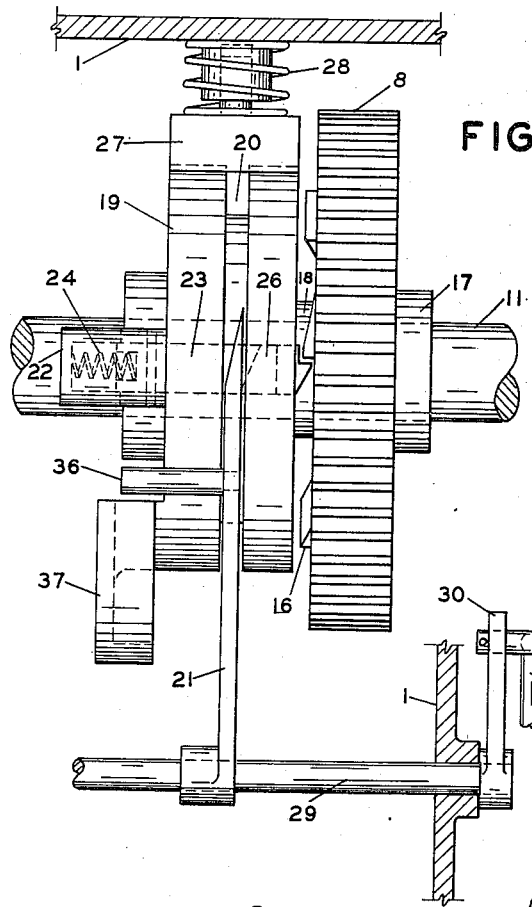
FIG. 3
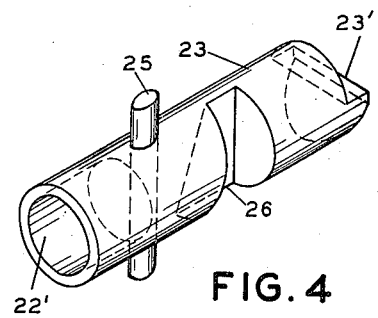
FIG. 4
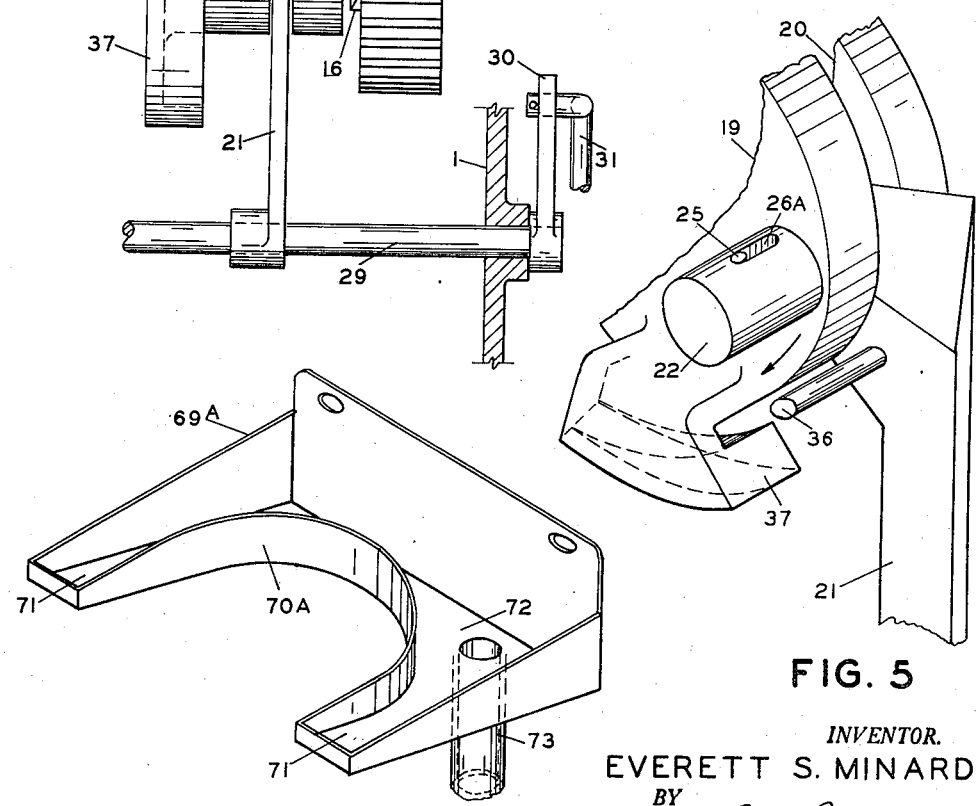
FIG. 5
FIG. 6
INVENTOR.
EVERETT S. MINARD
BY
A. Schapp
ATTORNEY June 10, 1941.  E. S. MINARD  2,245,287
LIQUID METERING MACHINE
Filed March 9, 1940  4 Sheets-Sheet 3

INVENTOR.
EVERETT S. MINARD
BY
A. Schapp
ATTORNEY

June 10, 1941.  E. S. MINARD  2,245,287
LIQUID METERING MACHINE
Filed March 9, 1940  4 Sheets-Sheet 4

INVENTOR.
EVERETT S. MINARD
BY
A. Schapp
ATTORNEY

Patented June 10, 1941

2,245,287

UNITED STATES PATENT OFFICE 2,245,287

LIQUID METERING MACHINE

Everett S. Minard, San Francisco, Calif., assignor to Walter King, San Francisco, Calif.

Application March 9, 1940, Serial No. 323,121

8 Claims. (Cl. 221—103)

The present invention relates to improvements in a liquid metering machine and has particular reference to a machine for measuring out a free-flowing material in equal amounts.

Metering machines in general rely upon gravity flow of the material into a predetermined measuring pocket in which the material is trapped and then allowed to flow from the pocket.

One of the objects of the present invention is to provide a machine of the character described in which a piston operates within the measuring pocket, creating a vacuum for more rapidly charging the pocket on the suction stroke and providing for the positive discharge on the power stroke.

It is further proposed to provide means whereby the size of the discharge opening may be readily adjusted for more accurately measuring the material.

Another object of my invention is to provide means for guiding drippings adhering to the discharge port wall after the discharge has been closed, away from the latter port, and to catch the same in a specially constructed drip pan, whereby the space directly underneath the discharge port is kept clean.

It is still further proposed to provide a simple operating mechanism in which a single member performs the two functions of operating the piston and the valves controlling the ports of the measuring pocket in such a manner that the stroke of the piston, as well as the degree to which the outlet port opens during each stroke of the piston may be readily adjusted.

It is further proposed to provide a measuring pocket in which the intake port is disposed at a higher elevation than the remainder of the pocket, whereby the trapping of air in the pocket is prevented and a complete filling of the pocket with material during the suction stroke is insured.

Another object of the present invention is to provide a novel clutch arrangement whereby the power may be connected to the driving member at the option of the operator, and is automatically disconnected at the end of a designated period corresponding to one reciprocating movement of the piston, means being provided to cause the driving member to immediately come to a positive stop and to cause the manually operated means for starting the member to automatically and positively return to its initial position.

And finally it is proposed to provide a structural arrangement in which the different parts of the machine are readily accessible for disassembling, whereby particularly the cleaning of the measuring pocket, is greatly facilitated.

Further objects and advantages of my invention will appear as the specification proceeds, and the novel features thereof will be fully set forth in the claims hereto appended.

The preferred form of my invention is illustrated in the accompanying drawings, in which:

Figure 1 shows a side view of the complete machine;

Figure 2, a somewhat schematic side elevation of the driving means;

Figure 3, an end elevation of the driving means;

Figure 4, an isometric detail view of a clutch pin;

Figure 5, an isometric fragmentary detail view of a portion of a clutch drum and a cooperating clutch finger;

Figure 6, an isometric view of a drip catch pan;

Figure 7, an end elevation of the measuring pocket showing the drip catch pan in cooperative relation thereto;

Figure 8, a section taken along line A—A of Figure 1;

Figure 9, an isometric view of a valve controlling both intake and exhaust ports of the measuring pocket;

Figure 10, a longitudinal section through the measuring pocket, with attendant parts, showing the intake port open and the discharge port closed;

Figure 11, a similar view showing the intake port closed and the discharge port open, the valve being adjusted to a small discharge port opening; and Figure 12, a view similar to Figure 11, with the valve adjusted to provide a maximum discharge opening.

Although I have shown only the preferred form of my invention, I wish to have it understood that various changes or modifications may be made within the scope of the claims hereto attached, without departing from the spirit of the invention.

Referring to the drawings in detail, the numeral 1 indicates a gear case which is mounted on a base 2 to form a supporting means for the machine. An arm 3 extends from the gear case 1 and supports a measuring pocket 4 in alinement with the operating mechanism of the invention.

Within the gear case is mounted a train of gears 5, 6 and 7, held in proper position and securely mounted on shafts 9 and 10. These shafts have supporting bearings, one on each side of the gear case.

A motor 12 is mounted on the gear case and drives a pulley 15 through a belt 14 from a pulley 13 on the motor shaft.

The pulley 15 is secured to the end of the shaft 9, which extends through the gear case, and motion is transmitted from this pulley, through the train of gears to the gear 8 which runs free on the shaft 11 within the gear case. Shaft 11 is supported on bearings, one on each side of the gear case. One end of this shaft extends through the gear case to provide driving means for the invention.

On one face of the gear 8 are a plurality of ratchet teeth 16, the contact faces of which are mounted radially and equidistant from the center of the gear. The gear is held against axial movement on shaft 11 by two collars 17 and 18, which are secured to the shaft, (see Figure 3).

A clutch drum 19 is secured to the shaft 11 in spaced and confronting relation to gear 8. An annular groove 20 is formed in the periphery of the drum 19 and forms a guide for a clutch finger 21, which has a concave portion to fit the bottom of the groove 20 and which is normally held in contact therewith.

A driving connection between the clutch drum and the gear 8 is established by a clutch pin 23 retractably mounted in the clutch drum parallel to the axis thereof and having a flat face 23' adapted to engage with any one of the ratchet teeth 16 on the gear for transmitting rotary movement from the gear to the clutch drum. The clutch pin is illustrated in detail in Figure 4, and is slidably mounted in a corresponding transverse hole in the clutch drum, the rear end of the pin extending into a hub 22 projecting laterally from the clutch drum. A spring 24 bearing on the end of the hub and the bottom of a socket 22' in the end of the pin tends to urge the pin forward into engagement with one of the ratchet teeth on the gear 8.

The clutch pin is held against rotary motion by a transverse pin 25 riding in a slot 26A in the hub 22, and is formed with a groove 26 in the side thereof, the bottom of this groove forming a continuation of the groove 20 in the clutch drum when the pin is in retracted position. One side of the groove is slanted as shown in Figure 3, and a small portion of this slanting side projects into the groove 20, even when the clutch pin is in advance position, as shown in the drawings in dotted lines.

The clutch finger 21, which has been described as normally riding in the groove 20 of the clutch drum has a wedge-shaped end, and serves to retract the clutch pin and to thereby withdraw the latter from engagement with one of the teeth of gear 8 by engaging with the slanting wall of the groove 26.

It will be noted that this withdrawal takes place only once during each revolution of the clutch drum and that it disconnects the drum from the gear 8.

To insure an immediate stop of the clutch drum after the clutch pin has been withdrawn, I provide a brake shoe 27, which is mounted above the clutch drum and has a concave surface to fit the periphery of the drum. This brake shoe is held slidably in place by a stem projecting into a hub which is part of the gear case 1. A spring 28 gives pressure to the brake shoe, causing enough friction against the periphery of the clutch drum to prevent the turning of the shaft 11 when the clutch pin has been retracted.

The clutch finger 21 is secured to a shaft 29 which is freely mounted in spaced relation to the clutch drum and one end of which extends through the gear case and connects with an arm 30. An operating rod 31 is pivoted to the arm 30 and extends through a support 32 on the base 2. A spring 33 is compressed between the support 32 and a collar 34, secured to the operating rod; the spring thus exerts a pull through the operating rod and normally holds the clutch finger in engagement with the bottom of the groove 20. The clutch finger may be lifted out of the groove for releasing the clutch pin by manual operation of the rod 31, the outward movement of the clutch finger being limited by a stop 35.

It is apparent that when the clutch finger is thus manually lifted out of the groove 20 the clutch pin 23 will immediately project forward for engagement with the nearest tooth on the rotating gear 8, and will cause the clutch drum to rotate with the latter. Immediately thereafter the rod 31, when released from manual operation, will automatically return the clutch finger to ride on the bottom of the groove 20, under the influence of the spring 33. At the end of one revolution of the clutch drum, the clutch finger will thus be in position again to withdraw the clutch pin 23 and to bring the clutch drum to a stop.

It happens occasionally, depending upon the nature of the material to be measured out, that certain surfaces become sticky and that the pressure of the spring 33 is not sufficient to return the clutch finger 21 to operative position with respect to the groove 20. To insure positive return of the clutch finger to a position of contact with the bottom of the groove, I provide a cam 37 on the clutch drum, which cooperates with a finger 36, projecting from the clutch finger 21 in producing the desired results.

The pin 36 runs parallel to the periphery of the drum, and just clears the same, even when the clutch finger is in full engagement with the bottom of the groove 20. The cam 37, the inner face of which is intended for coaction with the pin 36, has a leading edge adapted to catch the pin 36 from the outside, even when the clutch finger 21 is in its most retracted position, and the remainder of the cam is shaped to gradually force the pin 36 inwardly and the finger 21 into engagement with the bottom of the groove.

It is apparent that the trailing edge of the cam 37 must be positioned to clear the pin 36 when the finger has withdrawn the clutch pin and the drum has come to a standstill, because otherwise, it would be impossible to manually swing back the clutch finger 21 for starting a new operation.

The shaft 11 which rotates with the clutch drum, project outside the gear case 1, and carries a driving plate 38 which is used for operating the piston 39 of the measuring pocket, and also the valve controlling the ports thereof. The piston is operated by means of a crank pin 40 fitting, with freedom of sliding motion, in a slot 41 of a crank arm 42. The latter is hingedly suspended from a stud 43 projecting from the gear case. The piston 39 connects to the crank arm 42 through a connecting link 44, which is connected at one end to the piston by a wrist pin 45, and at the other end to the crank arm 42 by a horse shoe fitting over a driving pin 46. The connecting link is held in position on the driving pin by a screw 47 which closes the open end of the horse shoe.

The crank pin 40 is formed integral with a block 48, which is slidable on the driving plate between two guide bars 49. A screw 50 mounted on the driving plate 38, is threaded through the block 48 to provide means for determining the location of the crank pin 40 with reference to the center of the driving plate 38. The position of the pin 40 determines the length of stroke of the piston 39 and the latter may thus be adjusted by moving the pin 40 toward, or away from, the axis of the driving plate.

The measuring pocket 4 is tubular in shape and is fixed to the gear case in alinement with the piston 39. The measuring pocket is open at one end to receive the piston 39, which fits slidably therein. On the opposite end of the measuring pocket is a transverse tubular valve housing 51, which is of larger inside diameter than the measuring pocket. It is horizontally disposed and forms a T-connection with the measuring pocket, and is open thereto at the intersection. An inlet port 52 extends upward from the tubular housing and a discharge port 53 is provided in the bottom of the housing. A suitable source of supply for material to be measured may be stored in the hopper 54, which connects with the inlet port and discharges therethrough by gravity and under the influence of a vacuum created by the piston.

A rotary shut-off valve 55 is rotatably fitted within the tubular valve housing. A cover plate 56 closes each end of the latter. A shaft 57 extends from the shut-off valve through one of the cover plates and connects with the valve lever 58.

Motion is imparted to the rotary shut-off valve by means of a rocking beam 63 pivotally mounted on the screw 64 secured in the gear case. This rocking beam is connected to the valve lever 58 by means of a link 65 and is operated by the driving plate 38 which has, at the inner face thereof, three cams 60, 61 and 62, cooperating with a stud 59 projecting from the rocking beam. The latter has a counter weight 66 secured to its extended rear end to balance the same and to prevent movement when the stud 59 is not actuated by any one of the cam sections 60, 61 and 62.

A concave section 67 is provided in the rotary shut-off valve of such a size as to permit the opening of only one of the ports to the tubular valve housing at a time. The two cams 60 and 62 are fixed on the driving plate 38, while the cam 61, which forms a continuation of the cam 60, is adjustable on the plate. It is pivoted to the plate at one end, adjacent cam 60, while its other end may be secured upon the plate by means of a screw 69 engaging in a slot 70.

It will be noted from Figures 10 to 12, inclusive, with the driving plate rotating clockwise, the cam 62 engages the stud 59 with its outer face and thereby raises the rear arm of the rocking beam. On continuation of the rotation the cam 60 engages the stud 59 with its inner face and depresses the rear arm of the rocking beam. Cam 61 continues to move the stud 59 in the same direction and the extent of the downward movement is controlled by the position of cam 61 with respect to the slot 70. The extent of the downward movement of the stud 59 again controls the degree to which the outlet port is opened on the exhaust stroke of the piston.

Figure 10 shows the stud 59 in engagement with the cam section 62 and at the trailing edge thereof. This position places the rotary shut-off valve so as to open the inlet port 52 and close the outlet port 53.

Figure 1:
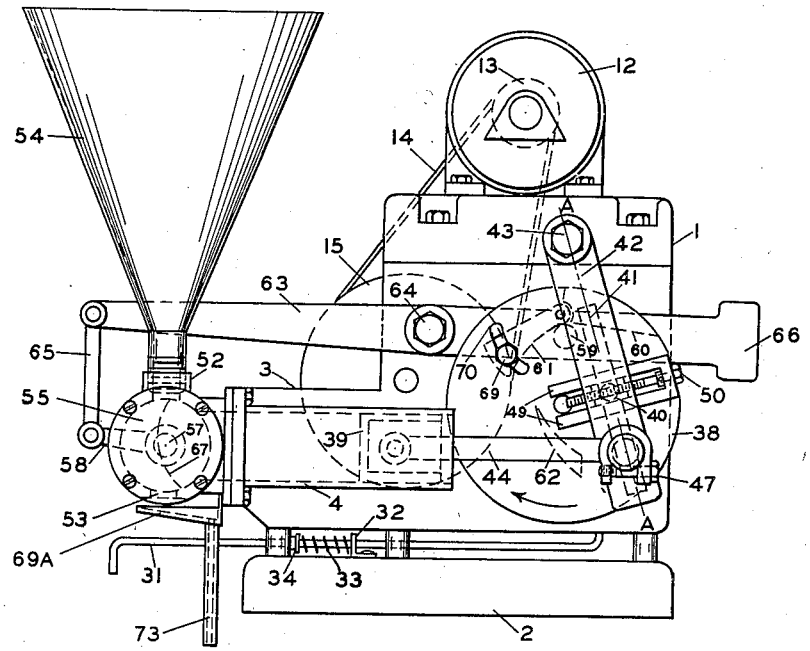

Figure 1 shows the position of the piston in the measuring pocket at its extreme backward position. The cam 60 has engaged the stud 59 and partially closed the inlet port. This is the normal rest position of the machine with the clutch disengaged. When the drive plate 38 begins to revolve clockwise, the cam 61 will immediately close the inlet port altogether and will open the outlet port to the extent of its adjustment.

Figure 7:
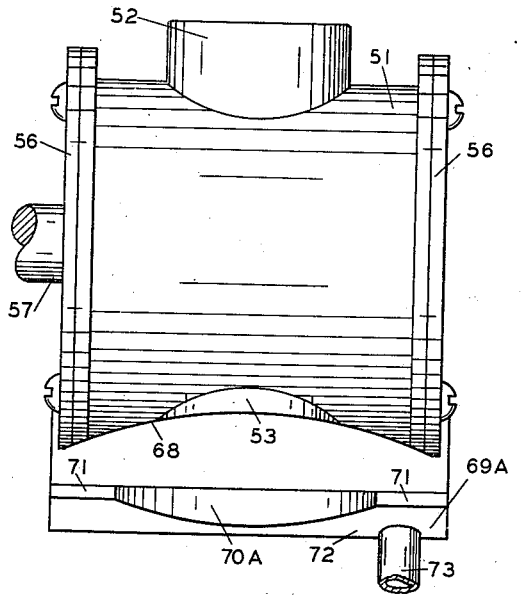
Figure 9:
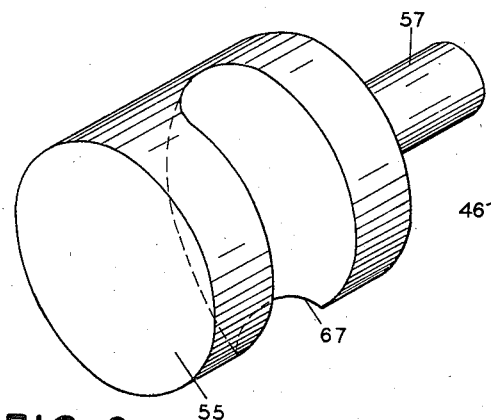
Figure 8:
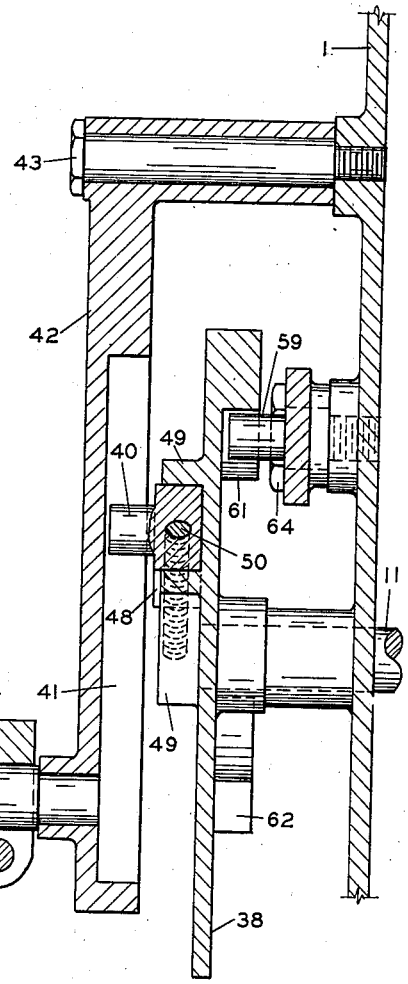
Figure 10:
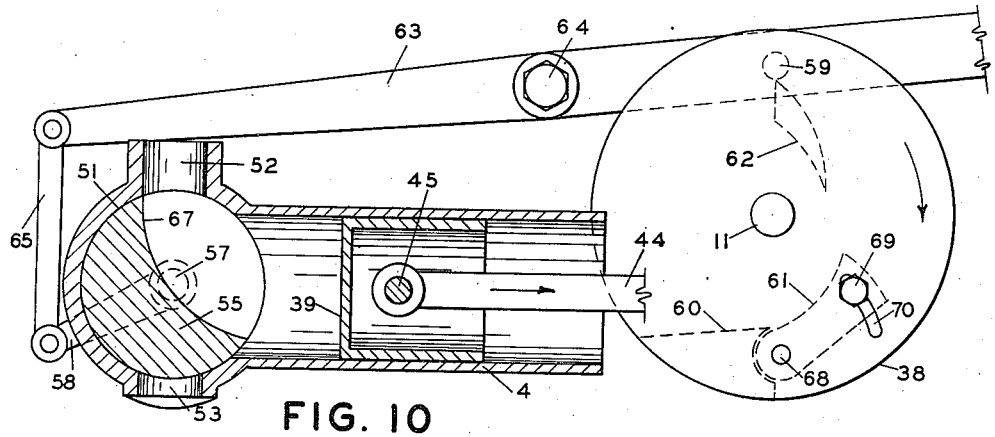
Figure 11:
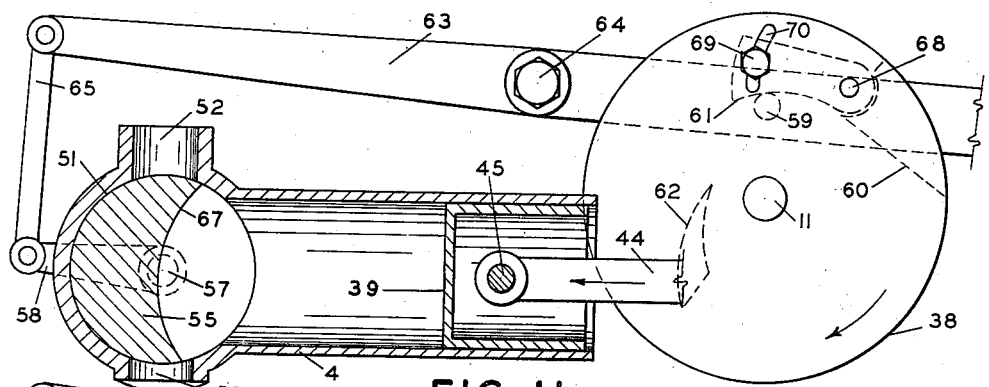
Figure 11 shows the stud 59 in engagement with the cam section 61. The cam section is adjusted so as to only partially open the outlet port and to completely close the inlet port.
Figure 12:
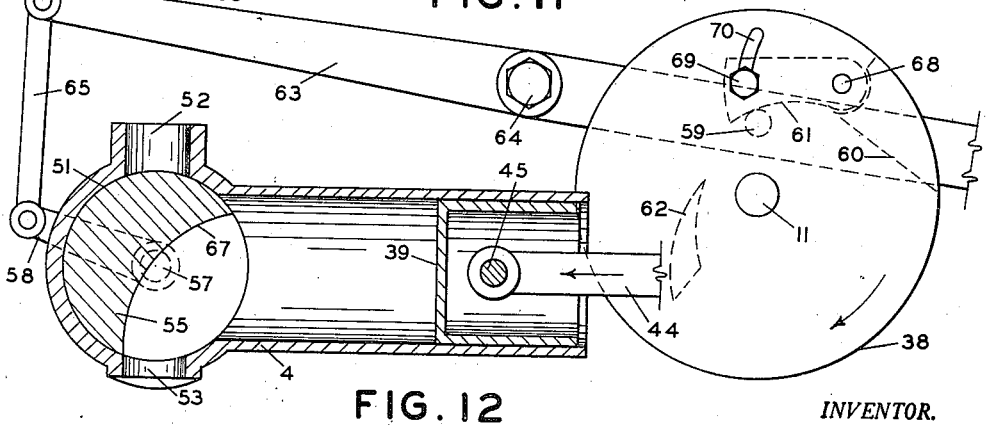
Figure 12 shows the parts in the same position as Figure 11, but with cam section 61 adjusted so as to completely open the outlet port. Any intermediate degree of opening of the outlet port may be arranged for by proper adjustment of the cam section 61.

The lower face of the tubular valve housing 51 is concave in shape, as shown at 68' in Figure 7. A drip catch pan 69A is mounted below said concave portion. A horse shoe shaped opening 70A, larger in diameter than the outlet port, is located concentric with the latter. The pockets 71 formed by the wings of the pan are positioned below the ends of the concave portion. The bottom 72 slopes from the pockets to a drain pipe 73.

Thus, after the outlet port closes, if there should be any drippings they will run down the concave bottom of the housing and drop into the pockets 71 of the drip pan to be guided away through the drain pipe 73.

Figure 2:
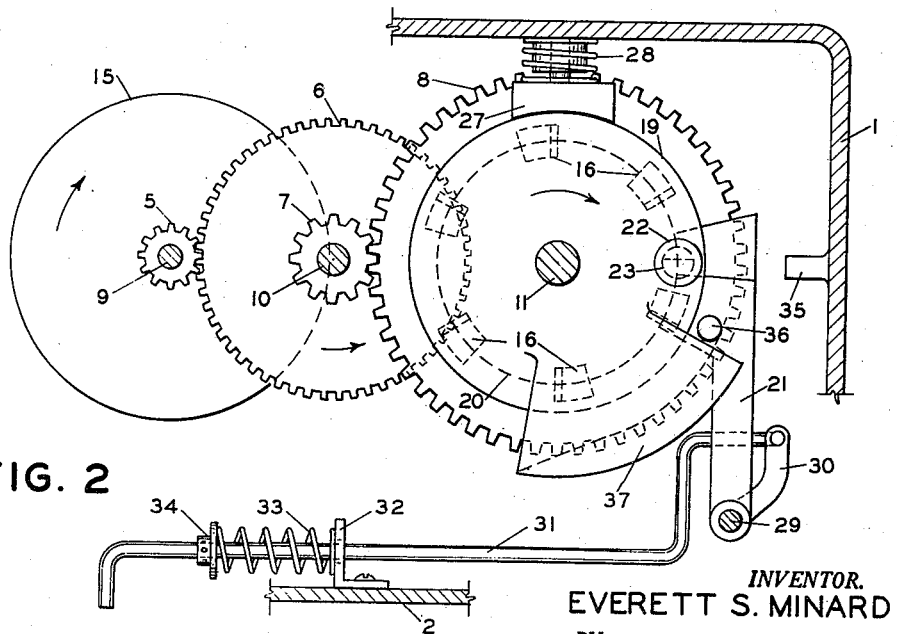

The operation of my invention will be readily understood from the foregoing description. The gear 8 rotates continuously in the direction indicated by the arrows. In the normal rest position, as shown in Figures 1 and 2, the clutch finger 21 is engaged with the clutch pin 23 and holds the same in retracted position so that there is no connection between the clutch drum and the gear 8, with the result that the clutch drum and all parts operated thereby are at rest. The brake shoe 27 imparts friction to the clutch drum 19 and prevents the latter from creeping ahead. This is important since otherwise, the clutch pin 23 might pass the clutch finger 21 and might be projected forward by its spring 24 to reengage the gear 8 before such engagement is desired.

When the operator desires to withdraw a measured quantity from the hopper 54, he first places a container underneath the outlet port, holding the same in the horse shoe shaped opening of the drip pan 69A, and then pushes the rod 31 toward the clutch finger, compressing the spring 33 and forcing the clutch finger 21 out of engagement with the clutch pin 23 and against the stop 35. The clutch pin now plunges forward into engagement with the nearest tooth on the gear 8 and as a result, the clutch drum, and with it the driving plate 38 begin to rotate.

As soon as the driving plate begins to rotate, the operator releases the rod 31, and the spring 33 returns the same to its initial position which causes the clutch finger 21 to return to its engagement with the bottom of the groove 20 in the clutch drum. The clutch finger thus is ready to again retract the clutch pin 23 when the clutch drum has completed one revolution and to thereby stop operation of the clutch drum and of all parts actuated thereby.

If the clutch finger should stick and the spring 33 is not sufficiently strong to return the clutch finger to the bottom of the groove 20, the cam 37 will pass back of the pin 36 attached to the clutch finger and will force the latter positively into the groove. This cam holds the clutch finger in the groove until the clutch drum is released at which time the shoe rides clear of the pin 36, as shown in Figure 2, so as to allow the clutch finger to be retripped for starting a new operation.

The purpose of the entire clutch assembly is to provide a break in a train of motion at a fixed interruption point, positive in action, and to provide means of reclosing the train of motion at will.

As the clutch drum is thus made to revolve, one revolution at a time, reciprocating motion is transmitted to the piston 39 by the crank pin 40 mounted on the driving plate 38 which rotates with the clutch drum. The length of the piston travel is determined by the amount the crank pin 40 is off-center with respect to the axis of the driving plate 38. This is adjustable through the screw 50.

The rotary valve 55 is actuated by the same driving plate in timed relation to the travel of the piston through means previously described. When in rest position, and during the return stroke of the piston, material is allowed to flow into the measuring pocket through the port 52. The diameter of the rotary valve being greater than the diameter of the measuring pocket, air is prevented from being trapped in the measuring pocket which would cause the latter to remain unfilled.

As motion is imparted to the piston from the rest position, the piston travels toward the rotary valve which latter revolves to close the inlet port and to open the outlet port, so as to allow the material to be forced through the latter. The length of travel of the piston determines the amount of material discharged.

On the return of the piston, the outlet port closes and the inlet port opens allowing material to be drawn into the measuring pocket to replace the vacuum created by the return of the piston.

By adjustment of the cam 61, the size of the discharge port can be varied to meet the requirements of different materials. Light materials require a smaller opening than heavier materials, and also the discharge of a large amount of material at one time, requires a larger port than the discharge of a small amount of material.

There is a tendency for a small amount of material to cling to the edges of the discharge port and to avoid this, the concave section 68' has been provided. This material creeps to the outer ends of the concave section where it drips into the pockets 71, and drains off through the drain pipe 73. The horse shoe opening permits the discharging material to pass through the drip catch pan without contacting the latter.

The piston may be removed by taking out the screw 47 and lifting the connecting rod off the driving pin 46 and withdrawing the piston from the measuring pocket. This permits thorough cleaning of the measuring pocket and the rotary valve.

I claim:

1. In a liquid metering machine, the combination of a tubular measuring pocket, a piston operable therein, a rotary valve controlling an inlet port to and an outlet from the said measuring pocket, driving means for said piston and turning means for said rotary valve, and means for fixing the amount of rotation of the rotary valve so as to control the size of the outlet port.

2. In a liquid metering machine, the combination of a measuring pocket, a piston operable therein to control the displacement of said measuring pocket, a rotary valve operating in connection therewith and controlling the opening and closing of an inlet port and an outlet port, and an adjustable cam section determining the amount of rotation of the rotary valve so as to make the size of the outlet port variable, means for catching any drip from the outlet port that may occur between the discharge periods and means for draining said drip away from the normal discharge.

3. In a liquid metering machine, a rotary valve, a rocking beam, a pivotal support for the latter, a driving connection between one end of the rocking beam and the valve, a rotary disc mounted with respect to the other end of the rocking beam and a cam drive between the disc and the rocking beam, the cam drive including a cam having one end pivoted to the disc and having the other end adjustably secured thereto whereby the extent of rocking movement of the beam may be controlled.

4. In a liquid metering machine, a rotary valve, a rocking beam, a pivotal support for the latter, a driving connection between one end of the rocking beam and the valve, a rotary disc mounted with respect to the other end, and a cam drive between the disc and the rocking beam, the cam drive including spaced cam elements acting on the rocking beam successively with intervening periods of rest when the disc is rotated and the rocking beam being substantially balanced on opposite sides of its pivot for causing the beam to remain stationary during the periods of rest.

5. In a liquid metering machine, a valve housing having a discharge port in the bottom thereof and means for periodically discharging liquid through said port in measured quantities, the bottom face of the valve housing being concave to curve downwardly from the port for guiding drippings forming during the intervening periods of rest in a lateral direction.

6. In a liquid metering machine, a valve housing having a discharge port in the bottom thereof and means for periodically discharging liquid through said port in measured quantities, the bottom face of the valve housing being concave to curve downwardly from the port for guiding drippings forming during the intervening periods of rest in a lateral direction, and a drip pan underneath the valve housing having a recess underneath the port for accommodating a receptacle in receiving relation to the discharge port and having lateral wings adapted to receive the drippings.

7. In a machine of the character described, a drip pan comprising a bottom plate having a recess in the front edge thereof, so as to form wings on opposite sides of the recess, and having flanges rising from the edges of the plate, the bottom plate having a drain hole and being made to drain downwardly toward the same.

8. In a liquid metering machine, a rotary valve, a rocking beam, a pivotal support for the latter, a driving connection between one end of the rocking beam and the valve, a rotary disc mounted with respect to the other end of the rocking beam, and a cam drive between the disc and the rocking beam, the cam drive including adjustable means for controlling the extent of rocking movement of the beam.

EVERETT S. MINARD.